(12) United States Patent
Allen et al.

(10) Patent No.: US 6,402,930 B1
(45) Date of Patent: Jun. 11, 2002

(54) PROCESS FOR THE ELECTROLYSIS OF TECHNICAL-GRADE HYDROCHLORIC ACID CONTAMINATED WITH ORGANIC SUBSTANCES USING OXYGEN-CONSUMING CATHODES

(75) Inventors: Robert J. Allen, Saugus; James R. Giallombardo, Beverly; Daniel Czerwiec, Wellesley; Emory S. De Castro, Nahant; Khaleda Shaikh, Concord, all of MA (US); Fritz Gestermann, Leverkusen (DE); Hans-Dieter Pinter, Wermelskirchen (DE); Gerd Speer, Burscheid (DE)

(73) Assignees: De Nora Elettrodi S.p.A. (IT); Bayer AG (DE)

( * ) Notice: Subject to any disclaimer, the term of this patent is extended or adjusted under 35 U.S.C. 154(b) by 0 days.

(21) Appl. No.: 09/654,553

(22) Filed: Sep. 1, 2000

Related U.S. Application Data

(63) Continuation-in-part of application No. 09/320,900, filed on May 27, 1999, now Pat. No. 6,149,782.

(51) Int. Cl.$^7$ ................................................ C25B 11/04
(52) U.S. Cl. ........................ 205/625; 205/618; 205/620; 205/622
(58) Field of Search ............................... 205/618, 620, 205/622, 625

(56) References Cited

U.S. PATENT DOCUMENTS

| | | | | |
|---|---|---|---|---|
| 4,141,828 A | * | 2/1979 | Okada et al. | 210/63 R |
| 4,294,706 A | * | 10/1981 | Kakihara et al. | 210/762 |
| 6,149,782 A | * | 11/2000 | Allen et al. | 204/290.14 |

* cited by examiner

*Primary Examiner*—Bruce F. Bell
(74) *Attorney, Agent, or Firm*—Bierman, Muserlian and Lucas

(57) ABSTRACT

A process for electrolyzing an aqueous solution of hydrochloric acid to chlorine in an electrochemical cell provided with an anode compartment and a cathode compartment including at least one gas diffusion cathode comprising an electrically conductive web provided on at least one side thereof with a coating of a catalyst for the electroreduction of oxygen comprising rhodium sulfide and optionally containing at least one fluorinated binder incorporated therein, comprising introducing aqueous hydrochloric acid containing contaminant species into the anode compartment and oxygen into the cathode compartment while impressing a direct electric current on the cell.

10 Claims, 16 Drawing Sheets

HCl electrolysis with ODC

HCl electrolysis with Pt catalysed ODC

HCl electrolysis with RhSx catalysed ODC

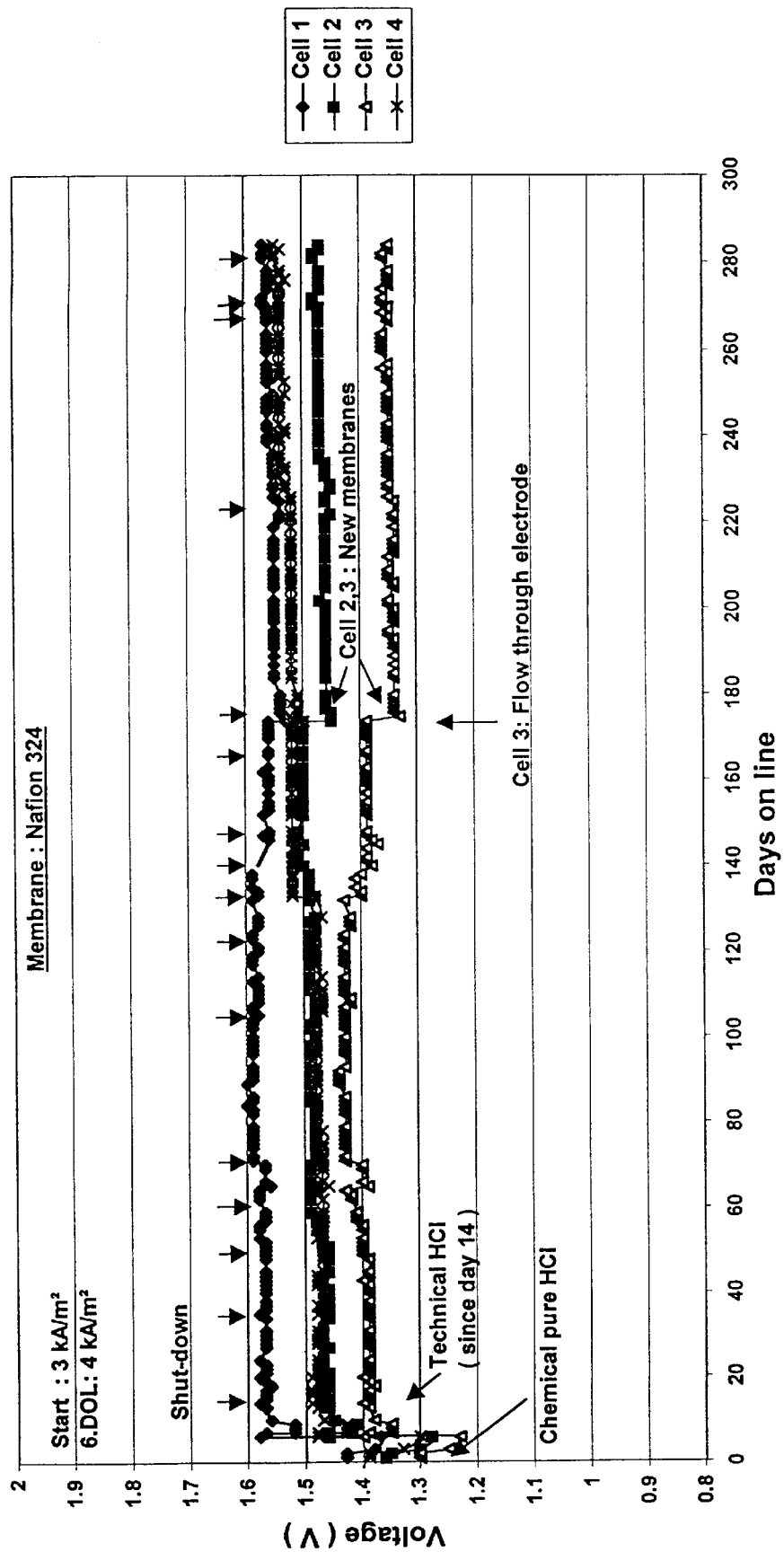

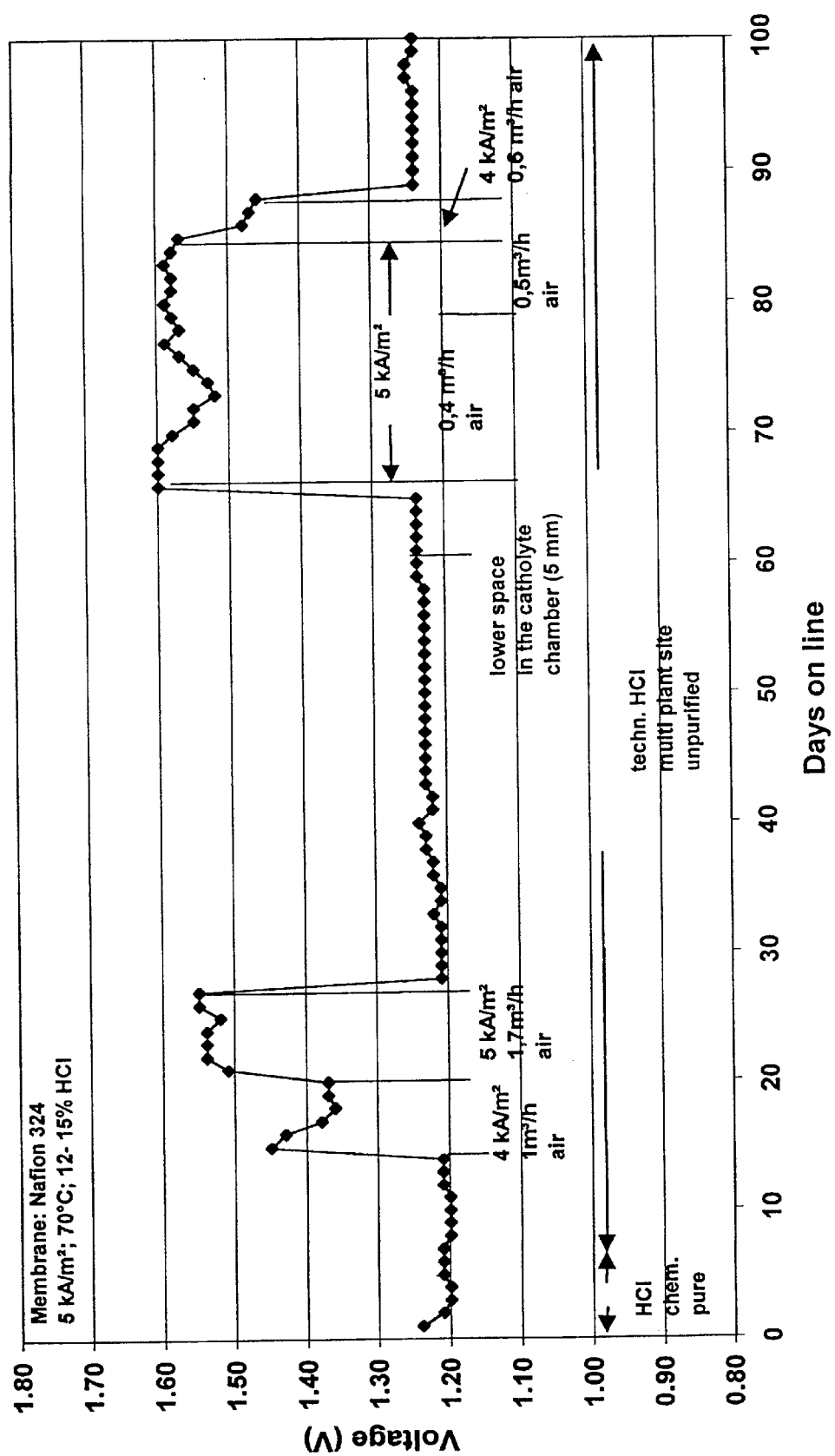

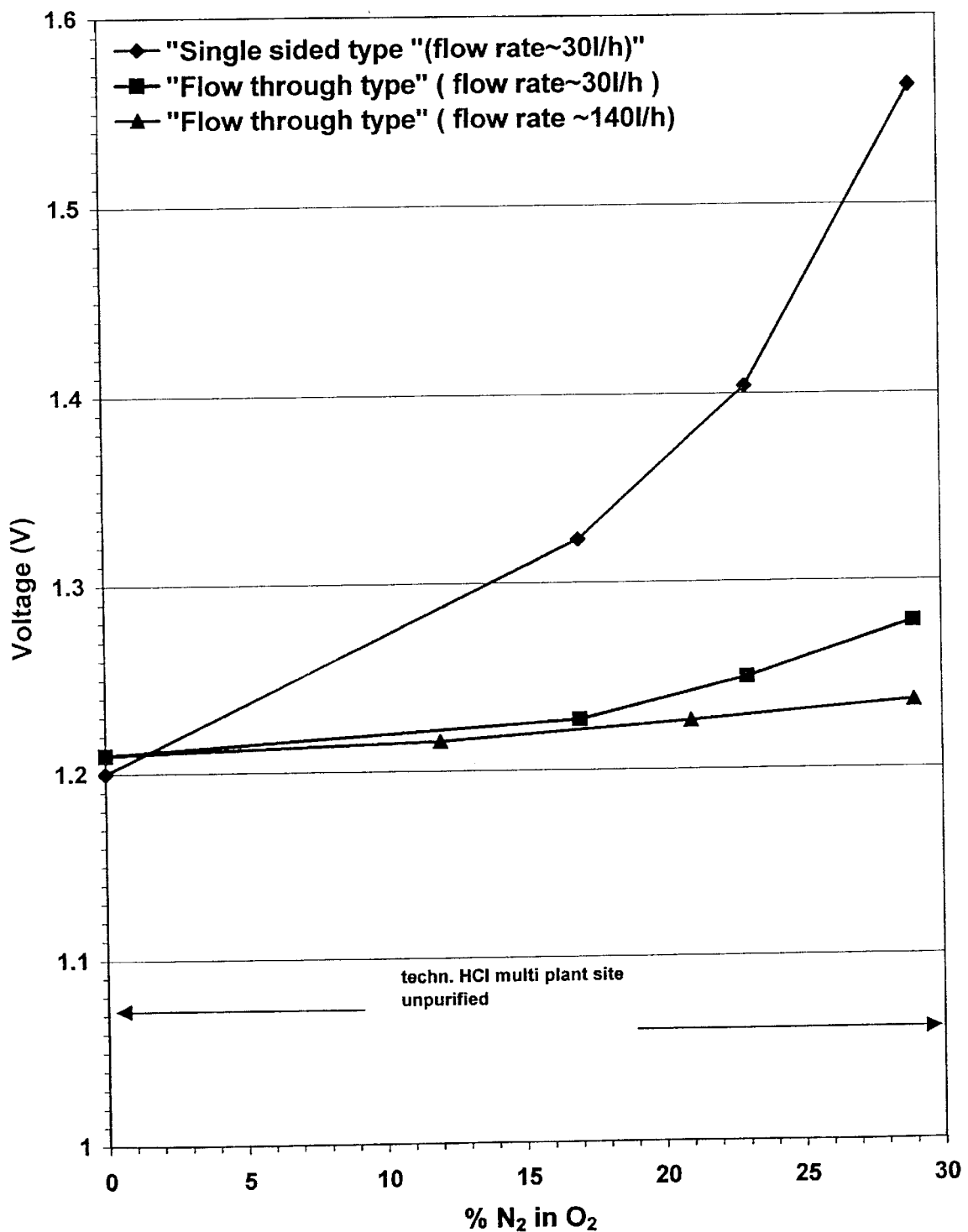

US 6,402,930 B1

PROCESS FOR THE ELECTROLYSIS OF TECHNICAL-GRADE HYDROCHLORIC ACID CONTAMINATED WITH ORGANIC SUBSTANCES USING OXYGEN-CONSUMING CATHODES

PRIOR APPLICATION

This application is a continuation-in-part of U.S. patent application Ser. No. 09/320,900 filed May 27, 1999, now U.S. Pat. No. 6,149,782.

FIELD OF THE INVENTION

The invention relates to a novel rhodium sulphide catalyst for reduction of oxygen in industrial electrolysers. The catalyst is highly resistant towards corrosion and poisoning by organic species, thus resulting particularly suitable for use in aqueous hydrochloric acid electrolysis, also when technical grade acid containing organic contaminants is employed.

The invention also relates to a process for the electrolysis of contaminated hydrochloric acid.

Hydrochloric acid is obtained as a waste product in a number of chemical processes. This applies in particular to addition reactions using phosgene, such as in isocyanate chemistry, where the chlorine used issues completely in the form of HCl. Hydrochloric acid is however also formed in substitution reactions, such as for example in the production of chlorobenzenes and chlorotoluenes, in which half of the chlorine used issues in the form of HCl. The third main source of HCl is the thermal decomposition of chlorine-containing compounds, in which chlorine issues completely in the form of HCl. If no direct use exists for the gaseous HCl, such as for example in oxychlorination processes, concentrated hydrochloric acid is formed by absorption in water or dilute hydrochloric acid. Chemically non-usable quantities can be very advantageously recycled to form chlorine by means of hydrochloric acid electrolysis, and in particular by means of hydrochloric acid electrolysis using oxygen-depolarised cathodes.

STATE OF THE ART

The electrolysis of aqueous HCl solutions is a well known method for the recovery of high-value chlorine gas. Aqueous hydrochloric acid is an abundant chemical by-product, especially in chemical plants making use of chlorine as a reactant: in this case, the chlorine evolved at the anodic compartment of the electrolyser can be recycled as a feedstock to the chemical plant. Electrolysis becomes extremely attractive when the standard hydrogen-evolving cathode is substituted with an oxygen-consuming gas diffusion electrode due to the significant drop in energy consumption. The ability of the gas diffusion electrode to operate successfully in this context is crucially dependent on the nature and performance of the catalyst, but also on the structure of the gas diffusion electrode.

Platinum is generally acknowledged as the most effective catalyst for the electroreduction of oxygen in a wide range of conditions; the activation of gas diffusion electrodes with platinum based catalysts is well known in the art, and finds widespread application in fuel cells and electrolysers of many kinds. However, the case of aqueous HCl electrolysis poses some serious drawbacks to the use of platinum as cathodic catalyst, as it is inevitable for the gas diffusion cathode to come at least partially in contact with the liquid electrolyte, which contains chloride ion and dissolved chlorine. First of all, platinum is susceptible to chloride ion poisoning which negatively affects its activity toward oxygen reduction; a second source of poisoning is constituted by contaminant species, especially organic species, which are in most of the cases dissolved in the by-product hydrochloric acid undergoing electrolysis. Even more importantly, the combined complexing action of hydrochloric acid and dissolved chlorine gas changes the platinum metal into a soluble salt which is dissolved away, making this material inappropriate for use in gas diffusion electrodes.

Other platinum group metals appear to follow a similar fate. For example, according to Pourbaix' Atlas of Electrochemical Equilibria in Aqueous Solutions, finely divided rhodium metal dissolves in hot concentrated sulphuric acid, aqua regia, and oxygenated hydrochloric acid. Similarly, (hydrated) $Rh_2O_3 \cdot 5H_2O$ dissolves readily in HCl and other acids. These problems have been partially mitigated with the disclosure of the rhodium/rhodium oxide based catalyst described in concurrent U.S. patent application Ser. No. 09/013,080. In particular, the rhodium/rhodium oxide system, although slightly less active than platinum towards oxygen reduction, is not poisoned by chloride ions. Also the chemical resistance to aqueous hydrochloric acid with small amounts of dissolved chlorine is sensibly enhanced with respect to platinum. However, an activation step is needed to obtain a sufficiently active and stable form of this catalyst, and some limitations arise when such catalyst has to be included in a gas diffusion electrode; for instance, the chemical and electronic state of the catalyst is changed upon sintering in air, a very common step in gas diffusion electrode preparations known in the art. Cumbersome and/or costly operations have to be carried out to replace this step, or to restore the active and stable form of the catalyst afterwards, as disclosed in U.S. Pat. No. 5,598,197. Furthermore, the required chemical stability is displayed only in the potential range typical of the electrolysis operation; extremely careful precautions have to be taken during the periodical shut-downs of the electrolysers, otherwise the sudden shift in the cathodic potential, combined to the highly aggressive chemical environment, causes the dissolution of a significant amount of catalyst, and the partial deactivation of the remaining portion. While tailored procedures for planned shut-downs of the electrolysers can be set up, although resulting in additional costs, little or nothing can be done in case a sudden, uncontrolled shut-down due to unpredictable causes (for instance, power shortages in the electric network) should occur. There is also no evidence that rhodium/rhodium oxide based catalysts are more insensitive to contaminants with respect to platinum based catalysts.

Technical-grade hydrochloric acid of the kind obtained for example in the above mentioned processes, is usually contaminated with partially chlorinated organic substances, such as for example monochlorobenzene or ortho-dichlorobenzene from the processes themselves, as well as possibly with organic substances from vessel linings, packing materials or pipelines. Such organic substances are obtained for example in the form of surfactants or acrylic esters. The total concentration measured in the form of the TOC can in fact greatly exceed 20 ppm. In the electrolysis of hydrochloric acid using oxygen-depolarised cathodes in initial tests in which platinum was used as the catalyst, the operating voltages were found to be sensitive to the degree of contamination: over a period of several weeks, and in some cases only a few days, an increase in the cell voltage by 150 to 300 mV was observed, a phenomenon which was at least partially reversed during experimental operation using chemically pure hydrochloric acid. Similar results were obtained after switching off the apparatus although the reduction in voltage did however disappear again after a few days. The object was to find a process which avoids this disadvantage of increased operational voltage in the presence of contaminated hydrochloric acid.

The hydrochloric acid typically recycled in production processes usually emerges from several feed streams with corresponding fluctuations in the content of organic or inorganic impurities. Besides the mentioned organic impurities typical inorganic contaminants are in particular sulphates, phosphates and sulphides. One attempt to solve this problem was the purification of technical grade hydrochloric acid using activated carbon. The effect of the reduction in the highly fluctuating TOC from between 20 and 50 ppm to approx. 10 ppm, accompanied by the reduction in the content of chlorinated organic substances to <1 ppm, already produced a considerable improvement in the operation of the cell.

Subsequent purification of the concentrated, approx. 30% hydrochloric acid, with the aid of adsorber resins, allowed a reduction in the content of chlorinated organic substances to below the detection limit of 6 ppb. It was however also found that the non-chlorinated organic substances, which did after all make up the main proportion of impurities, rapidly exhaust the adsorptive capacity of the adsorber resin at the high impurity contents, so that these organic substances break through the adsorption column and have a negative effect on the operating voltage of the electrolysis. The cell voltage increases accordingly. The regeneration of the adsorber resin with methanol according to the manufacturers' specifications would be relatively laborious and, given the above contents of impurities, would have to be carried out every few days. Due to the risk of explosion which must be taken into account the adsorber resin container would have to be removed and regenerated externally.

If the hydrochloric acid does however stem from a direct connection to an isocyanate unit the content of impurities is considerably lower and consists essentially of the constituents mono- and dichlorobenzene, which can be removed very successfully by means of activated carbon as well as adsorber resins to levels below the detection limit, and the regeneration cycles of the adsorber resin packing extend to several months up to about half a year, depending on the content of impurities.

Tests with platinum catalysed oxygen-depolarised cathodes all showed a similar high sensitivity towards organic impurities. In tests using rhodium oxide-catalysed oxygen-depolarised cathodes the sensitivity towards organic substances was found to be slightly less, although it was still quite considerable. The rhodium oxide catalyst had been developed in order to be able to dispense with polarisation upon switching the apparatus off. This catalyst did however reveal in tests that its structural stability was not sufficient. Thus the activation of an electrode in which this catalyst was used decreased by approx. 30% within only a few weeks.

OBJECTS OF THE INVENTION

It is an object of the invention to provide a novel catalyst for oxygen reduction having desirable and unexpected chemical stability towards highly corrosive media.

It is another object of the invention to provide a novel catalyst for oxygen reduction having desirable and unexpected electrocatalytic activity in presence of organic contaminants.

It is another object of the invention to provide novel gas diffusion electrodes with a novel catalyst therein having desirable and unexpected electrocatalytic properties.

It is another object of the invention to provide a novel electrolytic cell containing a gas diffusion electrode of the invention and to provide an improved method of electrolysing hydrochloric acid to chlorine.

These and other objects and advantages of the invention will become obvious from the following detailed description.

THE INVENTION

A more effective catalyst having the advantages of the chemical stability of rhodium in the presence of hydrochloric acid is rhodium sulphide. Test electrodes in which $RhS_x$. is used as a catalyst displayed the expected stability after switching off the electrolysis, without polarisation, and the required resistance to catalyst losses due to washing out.

It was however surprisingly found that electrodes in which $RhS_x$ is used as the catalyst are almost completely non-sensitive to the broad spectrum of organic and inorganic impurities. Whereas Pt-catalysed electrodes underwent an increase in the operational voltage of up to 260 mV within ten days, even when purified hydrochloric acid was used, and $RhO_x$-catalysed electrodes also underwent an increase of 100 mV under similar conditions, tests using $RhS_x$-catalysed electrodes and purified hydrochloric acid revealed only a slight increase of about 20 mV compared with cells operated with chemically pure hydrochloric acid and only an increase of about 40 mV compared with the value obtained using purified hydrochloric acid even when completely non-purified hydrochloric acid was used. This increase proved to be reversible when purified acid was once again subsequently used. The difference in the operation of the cell when purified technical-grade hydrochloric acid was used as opposed to chemically pure hydrochloric acid has also been demonstrated in additional tests to be between a non-detectable increase in voltage and a maximum increase of 30 mV in the operating voltage of a cell operated under typical electrolysis conditions (current density: 5 kA/m$^2$, operating temperature: 70° C., 13–14% HCl).

It is thus by all means advantageous for the technical-grade hydrochloric acid to be pre-purified via an activated carbon line and possibly in addition via an adsorber resin bed, in order to avoid even small increases in the operating voltage. Purification is at any case recommendable, in order to avoid the further reaction of mono- and dichlorobenzene at the anode to form hexachlorobenzene, since the latter is deposited as a solid in the electrolysis unit and the hydrochloric acid loops and can lead to problems especially in valves and pumps after long periods of operation.

An additional finding is noteworthy: oxygen depolarised cathodes of the flow-through type in which the carbon fabric was directly catalysed and which have an open structure, were able to be operated continuously at up to 5 kA/m$^2$ not only with pure oxygen but also with air or depleted oxygen and using organically contaminated hydrochloric acid. The other type used, in which the catalyst is applied to the carbon fabric in a form embedded in electrically conductive carbon dust (the single-sided type) already reached its limits at a content of nitrogen in the oxygen of approx. 30%: The operating voltage was 300 to 350 mV higher and thus already on the borderline of effective operation.

The novel electrochemical catalyst of the invention is comprised of rhodium sulphide, which may be either supported on a conductive inert carrier or unsupported. This catalyst does not require any activation step prior to its use, and surprisingly retains all of its electrocatalytic activity towards oxygen reduction in presence of chloride ions and organic molecules. Moreover, the catalyst is surprisingly not dissolved by the complexing action of aqueous hydrochloric acid/chlorine mixtures, thereby requiring no particular precautions during shut-downs when used in hydrochloric acid electrolysers. The catalyst is preferably coated on at least one side of a web, and may be used alone, with a binder, blended with a conductive support and a binder, or supported on a conductive support and combined with a binder. The binder may be hydrophobic or hydrophilic, and the mixture can be coated on one or both sides of the web. The web can be woven or non-woven or made of carbon cloth, carbon paper, or any conductive metal mesh.

Examples of high surface area supports include graphite, various forms of carbon and other finely divided supports but carbon black is preferred.

Such catalyst coated webs can be employed as gas diffusion cathodes exhibiting cell voltages, current densities and a lifetime that could not be previously obtained under normal operating conditions, especially when used in highly aggressive environments and with low purity reactants, such as the case of electrolysis of by-product hydrochloric acid.

The catalyst may be easily prepared upon sparging hydrogen sulphide gas in an aqueous solution of a water soluble rhodium salt. Nitrogen gas may be used as a carrier for hydrogen sulphide, and a pure nitrogen flow may advantageously be used to purge excess hydrogen sulphide upon completion of the reaction. The resulting solids are recovered by filtration, washing and drying to constant weight at 125° C., for example. The rhodium sulphide obtained in this way is unsupported (unsupported catalyst). However, when the aqueous solution of the water soluble rhodium salt further contains a suspension of a suitable conductive support, then the rhodium sulphide is preferentially deposited as tiny particles on the surface of the conductive particles (supported catalyst). The resulting hydrated form of rhodium sulphide must be heated in an inert atmosphere at 550 to 650° C., and preferably above 600° C. to form an anhydrous form of rhodium sulphide catalyst. The heating may be for several hours depending on the size of the batch, and the choice of the temperature is crucial for the formation of a sufficiently stable catalyst.

If the temperature is too low such as 300° C., the resulting crystallites are not well-defined and the catalyst stability is not sufficient. If the temperature is too high, i.e., 725° C., the unsupported catalyst has excellent acid stability but is not electrically conductive enough.

BRIEF DESCRIPTION OF THE DRAWINGS

FIG. 14 shows the long time behaviour of the catalyst in a 4 element pilot electrolyser with an active area of 0.85 m$^2$.

FIG. 15 shows the comparative electrolysis of technical grade hydrochloric acid, pre-purified with activated carbon, in a laboratory cell with pure oxygen and with air. The ODC was of the flow through type.

FIG. 16 shows the sensitivity of different type morphology ODC against operation with depleted oxygen: a carbon powder carried catalyst (single sided type) and a directly catalysed electrically conductive web (flow through type).

In the following examples, there are described several preferred embodiments to illustrate the invention. However, it is to be understood that the invention is not intended to be limited to the specific embodiments.

EXAMPLE 1

100 grams of supported rhodium sulphide were prepared by the following procedure: 57.3 grams of RhCl$_3$.xH$_2$O (39.88% given as rhodium metal) were dissolved in 2 liters of de-ionised (D.I.) water, without any pH adjustment. 53.4 grams of Vulcan XC-72 active carbon were added, and the mixture was slurried with a magnetic stirrer.

Figure 1:
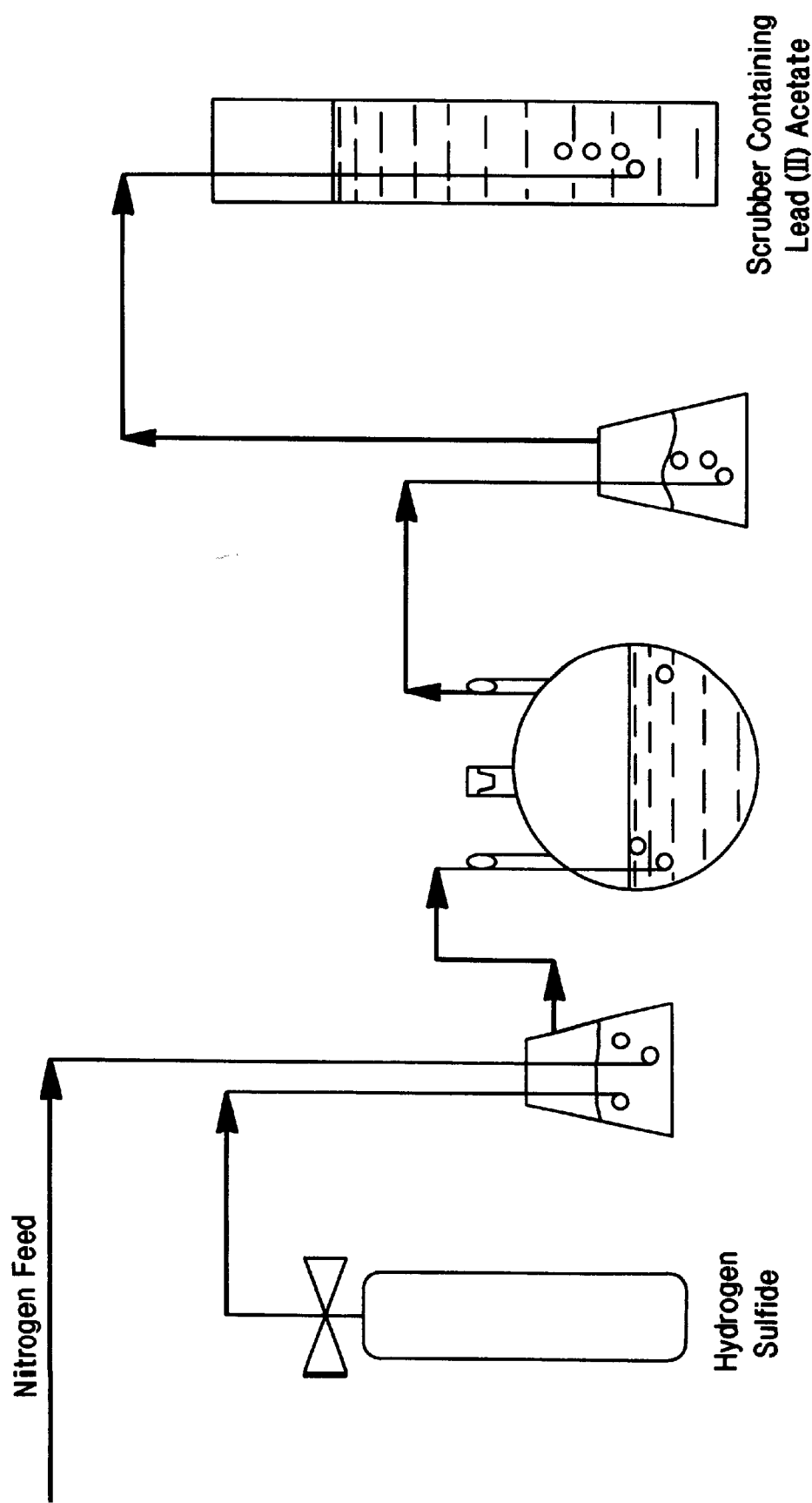
FIG. 1 is a schematic of reaction set-up for the generation of supported or unsupported rhodium sulphide.

Hydrogen sulphide gas was then sparged through the slurry at ambient temperature using nitrogen as a carrier gas, according to the scheme of FIG. 1. The mixture has been allowed to react as described for 7 hours. Upon completion of the reaction, nitrogen was purged through the system to remove residual $H_2S$. The remaining solution was vacuum filtered to isolate the solids, which were then washed with de-ionised water and dried at 125° C. to a constant weight.

The resulting catalyst cake was finally ground to a fine powder and subjected to 650° C. under flowing argon for two hours. A load of catalyst on carbon of 30%, given as rhodium metal, was obtained.

Figure 2:
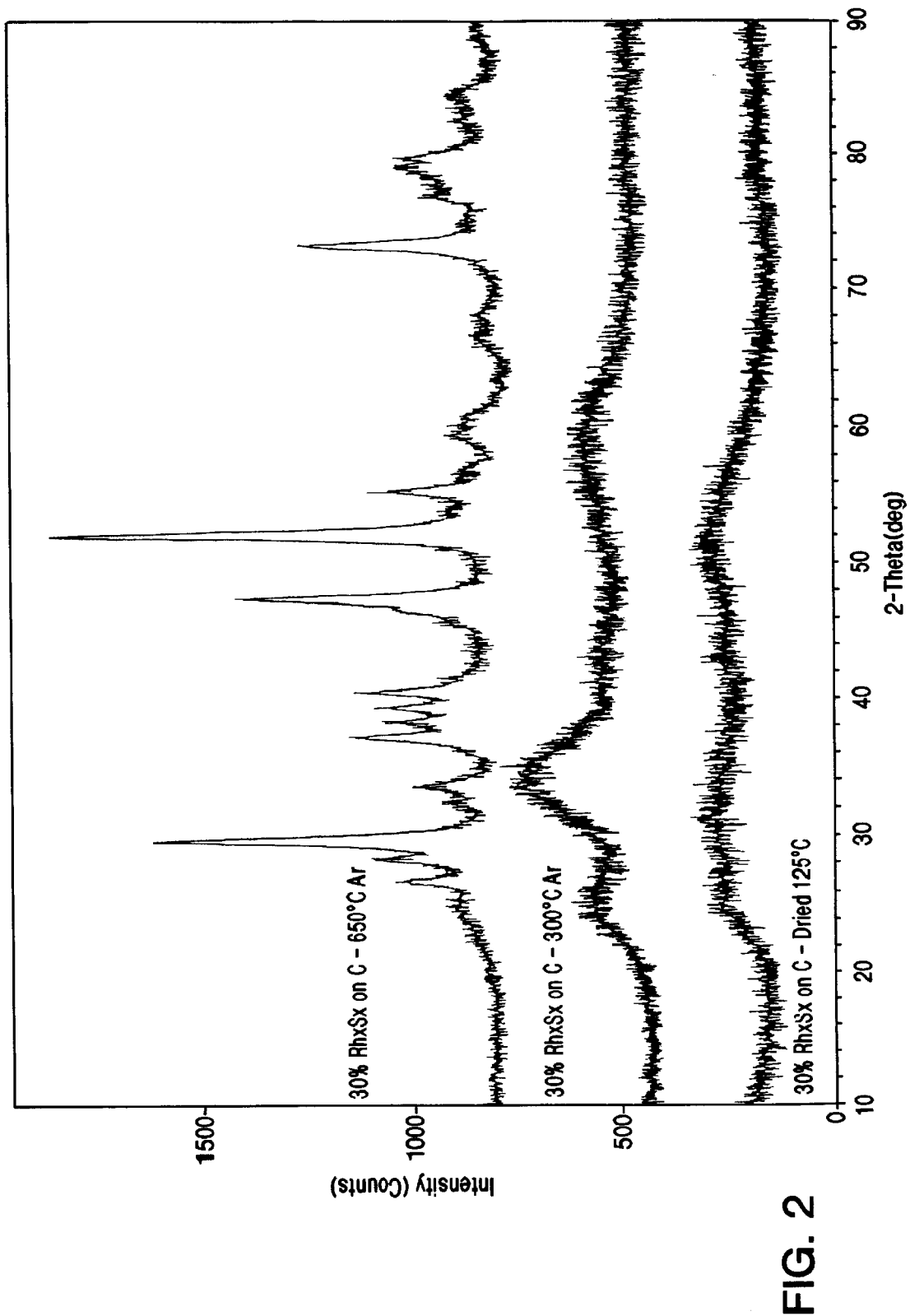
FIG. 2 shows X-ray diffraction patterns for rhodium sulphide precursors as a function of oven temperature. Trace 1: 30% RhSx on carbon, dried at 125° C. Trace 2: 30% RhSx on carbon, 300° C. in argon. Trace 3: 30% RhSx on carbon, 650° C. in argon.

As already stated before, this final thermal treatment is a crucial step in the preparation of the desired stable and active metal sulphide. FIG. 2 shows the development of a preparation of rhodium sulphide as outlined above as a function of treatment temperature. In particular, FIG. 2 shows the results of a powder sample XRD scan on a.) the supported catalyst after filtration and drying, b.) the supported catalyst of a.) after heating to 300° C. in argon, and c.) the supported catalyst of b.) after heating to 650° C. The increase in number and clarity of peaks in these scans indicates the formation of well-defined crystallites containing rhodium and sulphur. These changes induced in the XRD spectrograph by the temperature treatment also reflect corresponding substantial gains in catalyst stability.

EXAMPLE 2

8 grams of unsupported rhodium sulphide were prepared by the following procedure: 12.1 grams of $RhCl_3.xH_2O$ (39.88% given as rhodium metal) were dissolved in 700 ml of de-ionised water, without any pH adjustment. Hydrogen sulphide gas was then sparged through the slurry at ambient temperature using nitrogen as a carrier gas, according to the scheme of FIG. 1. The mixture has been allowed to react as described for 4 hours. Upon completion of the reaction, nitrogen was purged through the system to remove residual $H_2S$. The remaining solution was vacuum filtered to isolate the solids, which were then washed with de-ionised water and dried at 125° C. to a constant weight. The resulting catalyst cake was finally ground to a fine powder and subjected to 650° C. under flowing argon for two hours.

COMPARATIVE EXAMPLE 1

A rhodium oxide/rhodium catalyst on Vulcan XC-72 was prepared following the method disclosed in co-pending U.S. patent application Ser. No. 09/013,080 (Feb. 26, 1998) and herebelow repeated. 9.43 g of $RhCl_3.xH2O$ (39.88% given as rhodium metal) were dissolved in 2 liters of de-ionised water at room temperature, and the resulting solution was added to a dispersion of 8.75 g of Vulcan XC-72 in 500 ml of D.I. water. The mixture was stirred to maintain a uniform carbon slurry while slowly adding (2–3 ml/min) a 0.5 molar solution of ammonium hydroxide. Besides the 220 ml of ammonium hydroxide theoretically required to form $Rh(OH)_3$, a 20% excess of ammonium hydroxide was added to set a basic environment. The basic slurry was then stirred at 60–70° C. for 30–60 minutes and filtered hot. The filter cake was washed with about 200 ml D.I. water at 60–70° C. and dried in air at 125° C. for 15 hours.

The resulting cake was then ground to a fine powder and heated at 650° C. under flowing argon gas to dehydrate and stabilise the catalyst. The load of catalyst on carbon was 30%, given as rhodium metal. The catalyst powder was further subjected to an activation step by heating at 500° C. for 30 minutes under flowing hydrogen gas to further reduce some of the rhodium oxide to rhodium metal. As emphasised in co-pending U.S. patent application Ser. No. 09/013,080 (Feb. 26, 1998), activation of rhodium-rhodium oxide catalyst is essential to obtain the most active form of this catalyst.

COMPARATIVE EXAMPLE 2

100 grams of supported platinum sulphide were prepared according to the procedure of the above Example 1, whereby a solution of chloroplatinic acid was employed instead of the rhodium chloride salt.

EXAMPLE 3

The catalysts of all the above reported examples, along with commercially available platinum on Vulcan XC-72 (for example from E-TEK, Inc.), can be utilised in several different configurations. The catalyst of this invention is not limited by the structure of the gas diffusion electrode: for instance, in the present case, each catalyst of the above examples and comparative examples was incorporated in four different types of electrode structure, thereby obtaining sixteen different samples, according to the following procedures:

a) ELAT: A web of carbon cloth with a warp-to-fill ratio of unity and about 25 to 50 yams per inch, and a 97–99% of carbon content was selected from a commercially available product with a thickness of 10 to 15 mils. Carbon cloth with a thickness of 5 to 50 mils could have advantageously been used for this purpose. A mixture of fluorinated polymer (polytetrafluoroethylene, P.T.F.E., commercialised by DuPont under the trademark Teflon®) and Shawinigan Acetylene Black (SAB) carbon, commercialised by Cabot Corp., was coated on each side of the carbon cloth, air drying at room temperature after each coat, until reaching at a total loading of 8 to 10 $mg/cm^2$. A mixture of the powdered catalyst and Teflon® was then applied on one side of the carbon web in multiple coats until obtaining a layer of 0.5 to 2 mg of catalyst per square cm. After the final coat, the carbon cloth was heated to 340° C. for 20 minutes.

b). Single-sided ELAT: The above procedure for preparation of the ELAT was repeated except the SAB/Teflon® mixture was applied to only one side of the carbon cloth, with a loading of 4 to 5 $mg/cm^2$. The catalyst coat was applied on the same side, on top of the SAB/Teflon® layer.

c). Flow-through Electrode: A carbon cloth with the same specifications for the ELAT electrode was selected and 2 to 5 coats of a mixture of catalyst powder and Teflon® were applied to one side thereof. The coated fabric was then heated at 340° C. for about 20 minutes to obtain 1.03 $mg/cm^2$ of rhodium metal. The final heating step or sintering step is believed to melt the Teflon® and distribute it across the carbon catalyst. However, the sintering step may be successfully omitted for this electrode.

d). Membrane Electrode Assembly: An ink was formulated consisting of approximately 3 parts catalyst and 1 part (as dry weight) Nafion® ionomer, such as that sold by Solutions Technology, (Mendenhall, Pa.) as a suspension in a mixture of water and lower aliphatic alcohols such as methanol, propanol, and/or butanol. The ink was applied to a Nafion® 324 ion exchange membrane, commercialised by DuPont, held in place with a heated vacuum table, via spraying or painting. Other ion exchange membranes known in the art may have alternatively been utilised. Subsequent layers of the ink were applied until depositing 0.05 to 1 mg metal/cm² of catalyst. The assembly was further heated to remove solvents, and assembled with an appropriate electrode backing such as those disclosed in co-pending U.S. patent application Ser. No. 09/1184,089 (Oct. 30, 1998). The catalyst ink as described could alternatively have e been applied to an electrode backing, subsequently heated to remove solvents and assembled with an ion exchange membrane to form an equivalent membrane electrode assembly.

EXAMPLE 4

Prior to incorporation in gas diffusion electrodes, the resistance of this inventon's catalyst to corrosive media such as boiling solutions of $HCl/Cl_2$ can be simply determined and compared to prior art catalysts as well as rhodium sulphide prepared at various temperatures. One to five grams of the catalysts of Table 1 were placed in a 250 ml beaker containing 130 g/l chlorine-saturated HCl and heated to boiling. The formation of a deep colour indicates the dissolution of the metal from the catalyst, thus providing evidence for whether the catalyst would be appropriate for use in systems for the recovery of chlorine from aqueous HCl solutions.

TABLE 1

Summary of stability experiments for supported platinum and rhodium compounds, in boiling chlorine-saturated HCl

| Sample | Colour |
|---|---|
| Pt on Vulcan XC-72 (Commercial) | Gold |
| $PtS_x$/C Comparative Example 2 | Yellow |
| $Rh°-Rh_2O_3$/C Comparative Example 1 | Rose |
| $RhS_x$/C Example 1, (no heat treatment) | Brown |
| $RhS_x$/C Example 1 | Trace pink, essentially stable |

From this Table it is evident that in order to produce a stable form of rhodium sulphide, some heat treatment step is mandatory. It is also possible to conclude that not all sulphides of precious metals are stable in these conditions, and furthermore, in view of the instability of supported platinum sulphide, it is surprising to find supported rhodium sulphide relatively inert in these conditions.

EXAMPLE 5

Figure 3:
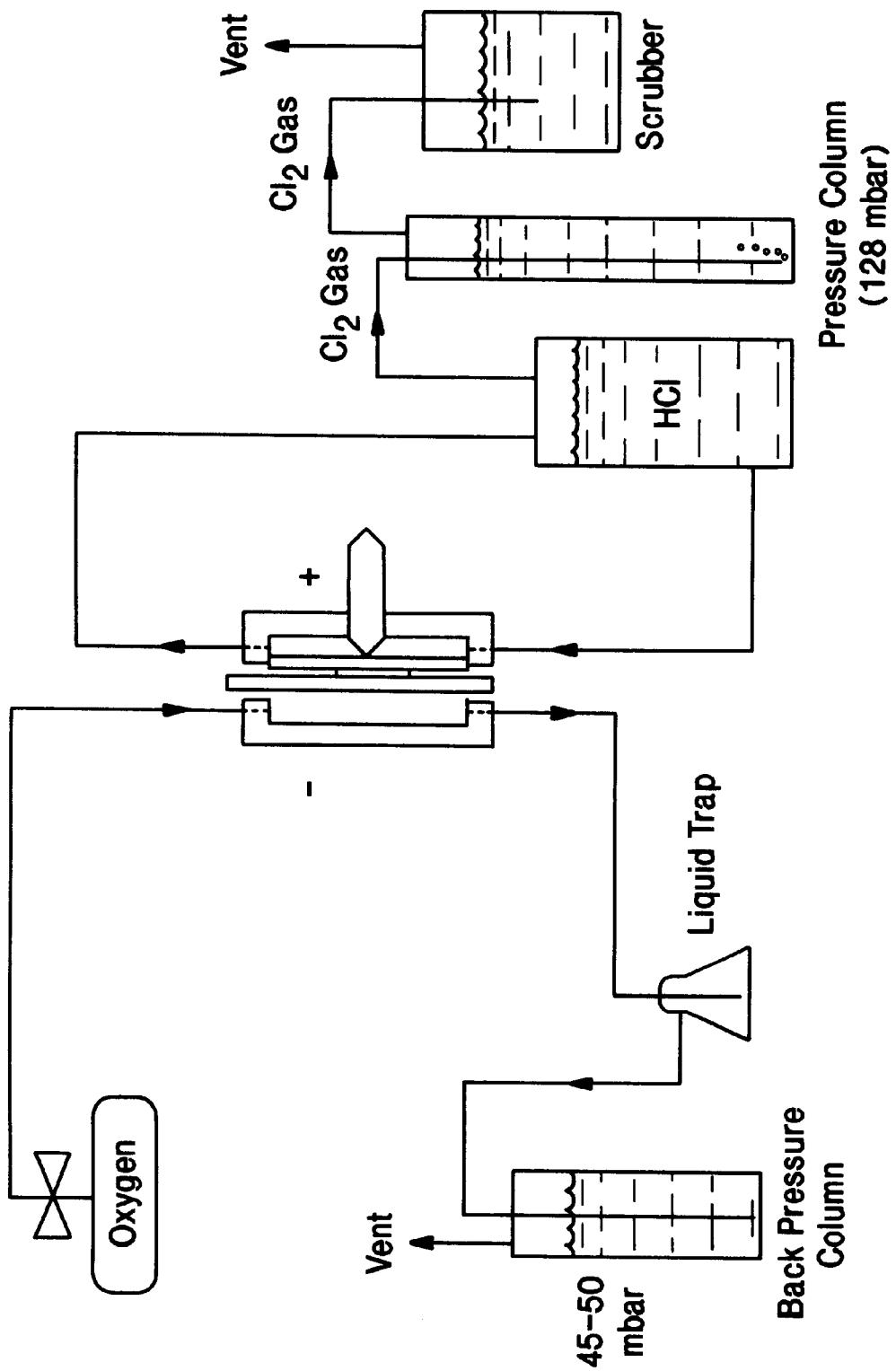
FIG. 3 is a schematic of flow system for the generation of $Cl_2$ from HCl using an oxygen depolarised gas diffusion electrode.

The electrodes of Example 3 were subjected to an electrolysis laboratory test according to the scheme of FIG. 3. This configuration had a 3 mm gap between the cathode and the anode. However, equivalent results were obtained with a "zero-gap" adjustment, where the cathode and the anode were both pressed against the membrane. The exposed electrode surface area was 6.45 cm² and the membrane was Nafion 324. The anode was titanium mesh activated with ruthenium oxide catalyst Oxygen was fed to the cathode at a rate of up to five-fold stoichiometric excess at 45–50 mbar pressure and 17% aqueous hydrogen chloride electrolyte (184±10 g/l) was fed to the anode. The said electrolyte was recirculated until 50% of the hydrogen chloride was depleted and then fresh electrolyte was added. The 50% depletion leads to a temporary increase in cell voltage, and is exhibited as "spikes" on a graph of voltage versus time. The electrolyte flow rate was 4 ml per minute or 0.372 m³/hour/m² at a back-pressure of 120 mbar. Unless stated otherwise, the cells were run at 3 kA/m² and all voltages were uncorrected for current collector resistance. The temperature of the cell and electrolyte was held at 55° C.±5° C. with heating tape applied to the cell metal end plates and an air conditioning unit.

In commercial electrochemical plants, two common temporary operation modes are encountered which reflect the situations of either scheduled repair or replacement of worn-out components, or the unscheduled failure of these components. For the scheduled shut-downs, one can induce a "controlled" procedure, whereby elements of the plant are systematically turned off or attenuated to a lower operational level. In particular, chlorine can be degassed on the anode side and oxygen can be substituted with nitrogen on the cathode side.

Conversely, during the unscheduled failures ("uncontrolled" shut-downs), components of the plant are typically subjected to the most rigorous of operating conditions. In particular, chlorine and oxygen are left in the cell and as a consequence severe corrosion conditions arise. Since it is an object of this invention to provide a catalyst and gas diffusion electrode capable of operation in an electrochemical plant, the catalyst-electrode assemblies were tested in simulated controlled and uncontrolled shut-downs.

These two interventions differ in the manner of turning off various components. For the controlled shutdown, an inert gas was fed to the cathode, and the rectifier current was slowly decreased, followed by turning the rectifier off. Once the rectifier was off, the pumps were halted. For the uncontrolled shut-down, oxygen flow was halted to the cathode while the rectifier and pump circuits were suddenly shut off, without the gradual decrease in current or flow rate.

Figure 4:
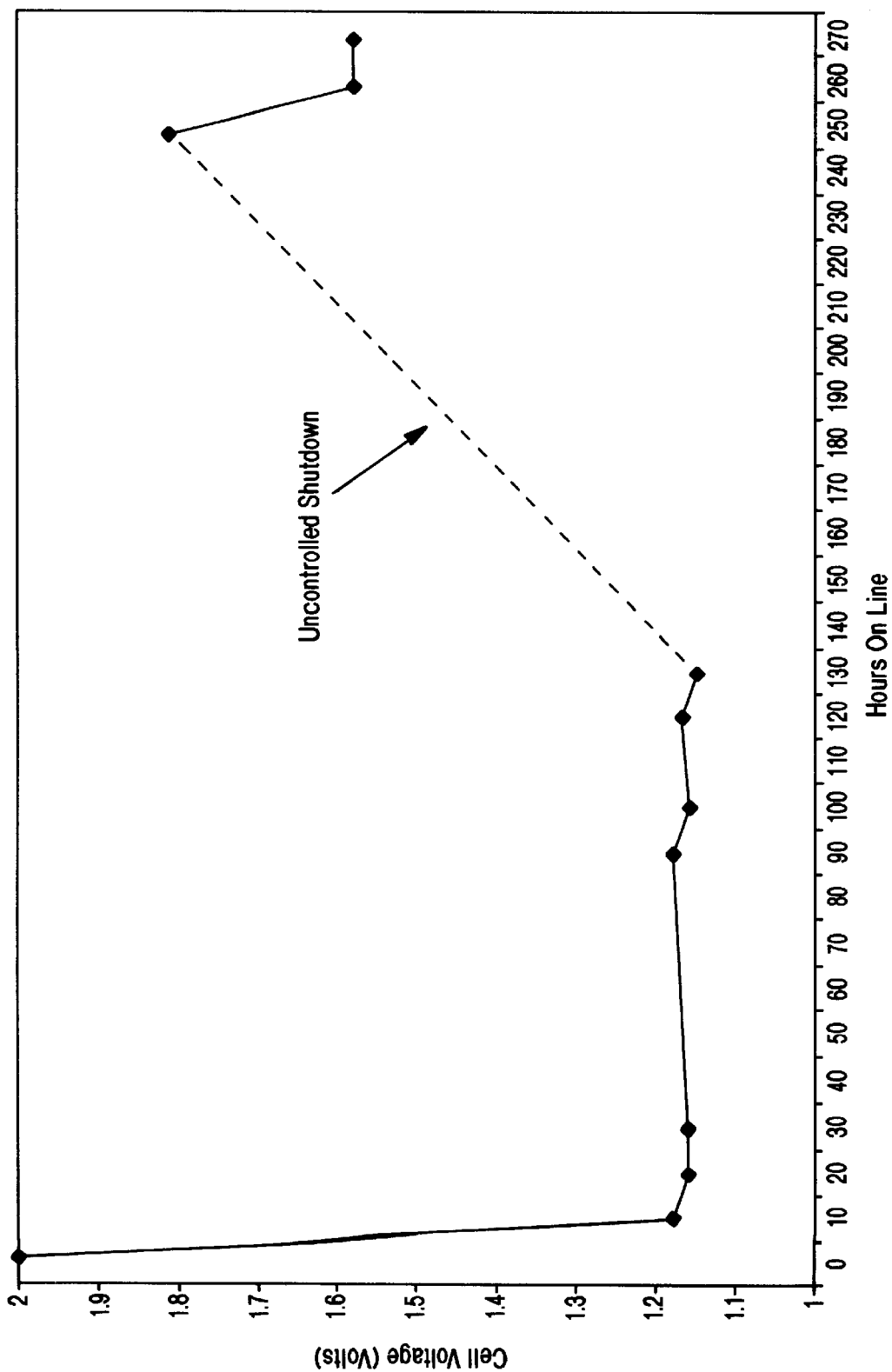
FIG. 4 shows typical platinum catalyst data, incorporated in a standard ELAT™ structure with 30% Pt/C, 1.1 mg/cm$^2$, coated with 0.70 mg/cm$^2$ Nafion, operating in HCl/Cl$_2$ solution at 3 kA/m$^2$. ELAT is a trademark of E-Tek, Natick (Mass.), U.S.A., which identifies gas diffusion electrodes comprising a carbon web and a mixture of catalyst and fluorinated binder incorporated therein.
Figure 5:
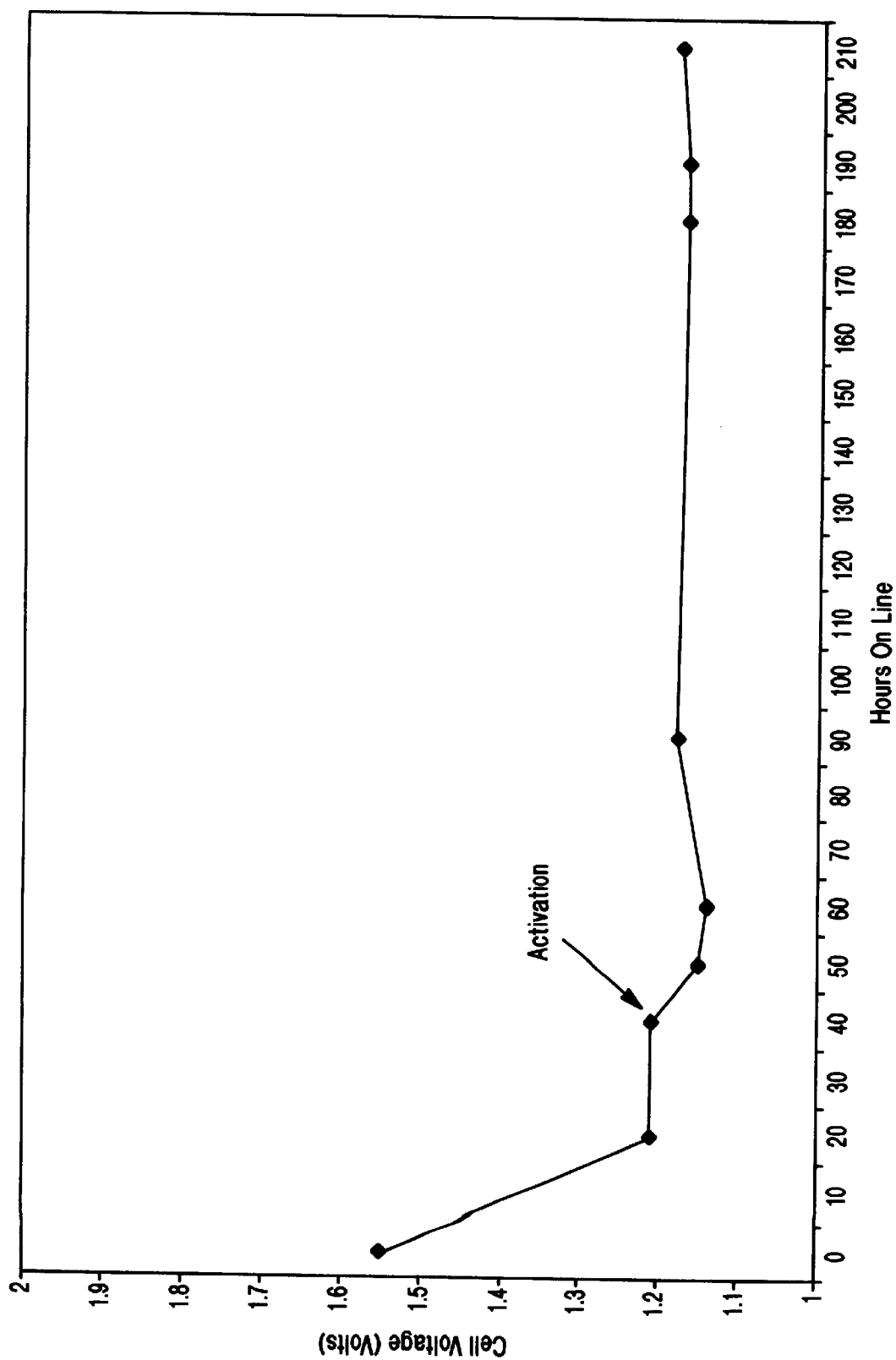
FIG. 5 shows data obtained with rhodium-rhodium oxide, incorporated in a single-sided ELAT™ structure with 30% Rh/C, 1.01 mg/cm$^2$, coated with 0.70 mg/cm$^2$ Nafion, operating in HCl/Cl$_2$ solution at 3 kA/m$^2$.
Figure 6:
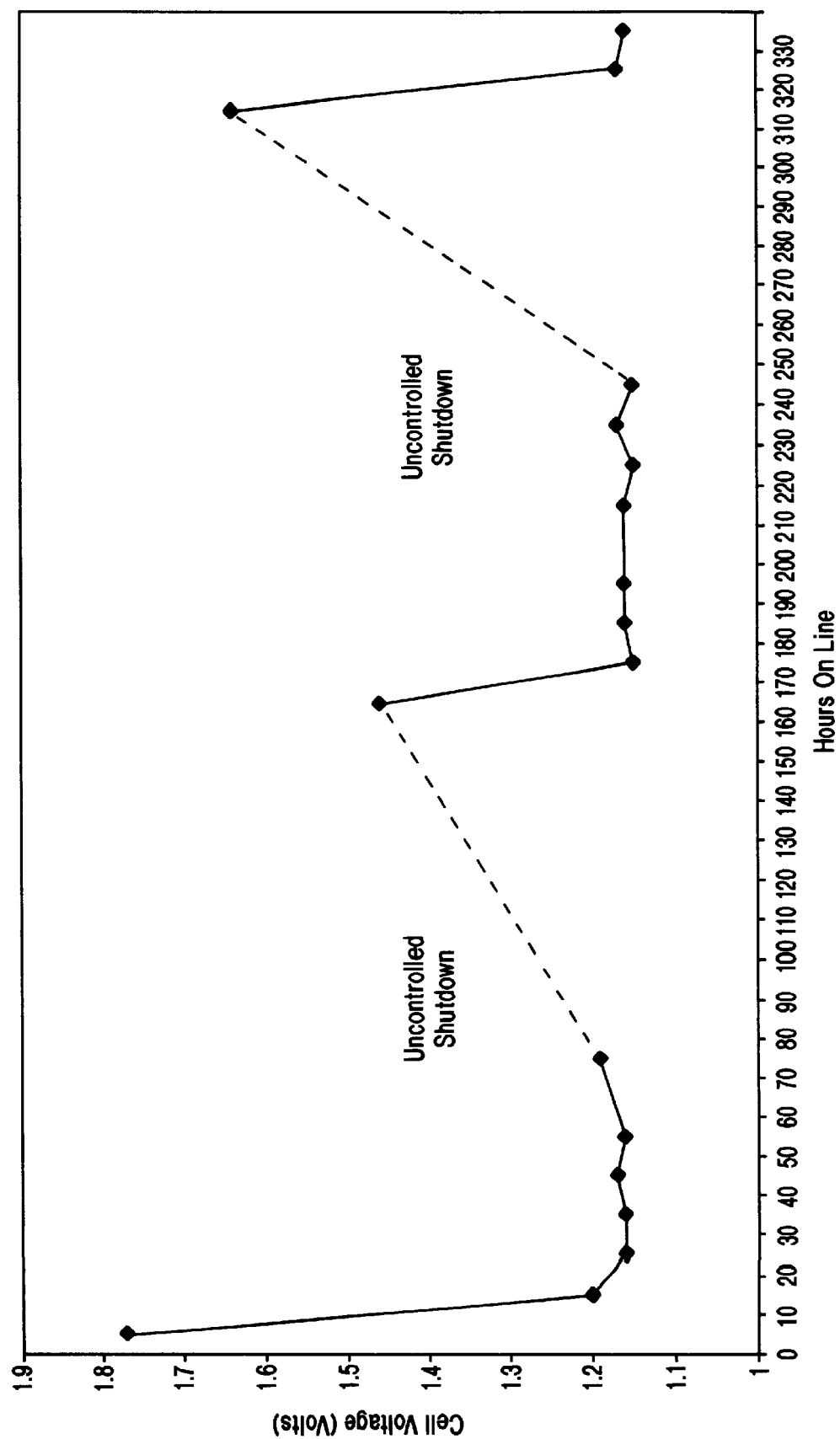
FIG. 6 shows data obtained with 30% RhS$_x$/C, incorporated in a single-sided ELAT™ structure with 30% Rh/C, 1 mg/cm$^2$, coated with 0.70 mg/cm$^2$ Nafion, operating in HCl/Cl$_2$ solution at 3 kA/m$^2$.

The catalyst of this invention was subjected to testing under the uncontrolled shut-down, and compared to current state-of-the art catalysts. FIG. 4 shows the typical platinum catalyst in an ELAT™ electrode. While the operating voltage is 1.15 volts, the uncontrolled shut-down causes the catalyst to experience the full corrosive force of the electrolyte, and the cell potential increases by over 500 mV. FIG. 5 shows the case of the rhodium/rhodium oxide of Comparative Example 1, incorporated in a single-sided ELAT, as described in Example 3, paragraph b). Here the initial steady-state voltage is just over 1.2 V, and only after activation does the voltage decrease below 1.2 V to approximately 1.18 V. FIG. 6 is the case of a single-sided ELAT made with the rhodium sulphide catalyst of Example 1, as described in Example 3, paragraph b). The steady-state voltage of 1.15 V was obtained without any form of activation of the catalyst, either prior to assembly in the electrode or during operation in the laboratory test system. FIG. 6 demonstrates that this new catalyst obtains desirable performance without an additional activation step, and that the catalyst activity is preserved after being exposed to the full corrosive force of solutions of $HCl/Cl_2$.

EXAMPLE 6

Since much of the waste aqueous HCl is generated after chlorinating an organic feedstock, there is often a significant level of organic contaminants in the recycled acid solution. Although one object in the design of oxygen reduction catalysts is to provide a catalyst that yields appreciable activity in the presence of high chloride ion concentrations, it is another goal to provide an oxygen reduction catalyst that yields appreciable activity in the presence of organic contaminants, as already mentioned. Such a catalyst may find utility in other applications as well, such as a cathode in Direct Methanol Fuel Cells (DMFC), whereby methanol crossing over from the anode to the cathode acts as a poison toward the latter when a platinum based state of the art catalyst, such as the commercial product cited in the Example 4, is used. In any case, it is well known that methanol ranks among the organic molecules with the highest activity towards adsorption on transition metals, therefore the behaviour in the presence of methanol of a transition metal-based catalyst is fairly representative of the general attitude of such catalyst to poisoning by organic contaminants.

The efficacy of the rhodium sulphide catalyst to reduce oxygen in the presence of organic molecules has been assessed in a potentiostated three-electrode system. The three-electrode or "half cell" method fits 1 $cm^2$ sample of gas diffusion electrode into an inert holder. The gas-fed side of the gas diffusion electrode is positioned into a plenum whereby an excess of air or oxygen is passed at low pressures (on the order of 10 mm of water or less). The face containing the catalyst (that would normally be against the membrane of an electrolyser or DMFC) is held in a 0.5M $H_2SO_4$ solution at a fixed temperature. The counter electrode is placed directly across the gas diffusion electrode, and a reference electrode is held in-between the two. The fixed geometry is maintained between the three electrodes through a specially constructed cap. A potentiostat is employed to control the potential and measure the current. A current interrupt device is placed in series with the electrodes and the internal resistance (IR) is subtracted from the readings. The direct addition of organic molecules such as methanol to the sulphuric acid solution allows the ready evaluation of catalyst performance in the presence of contaminants.

Figure 7:
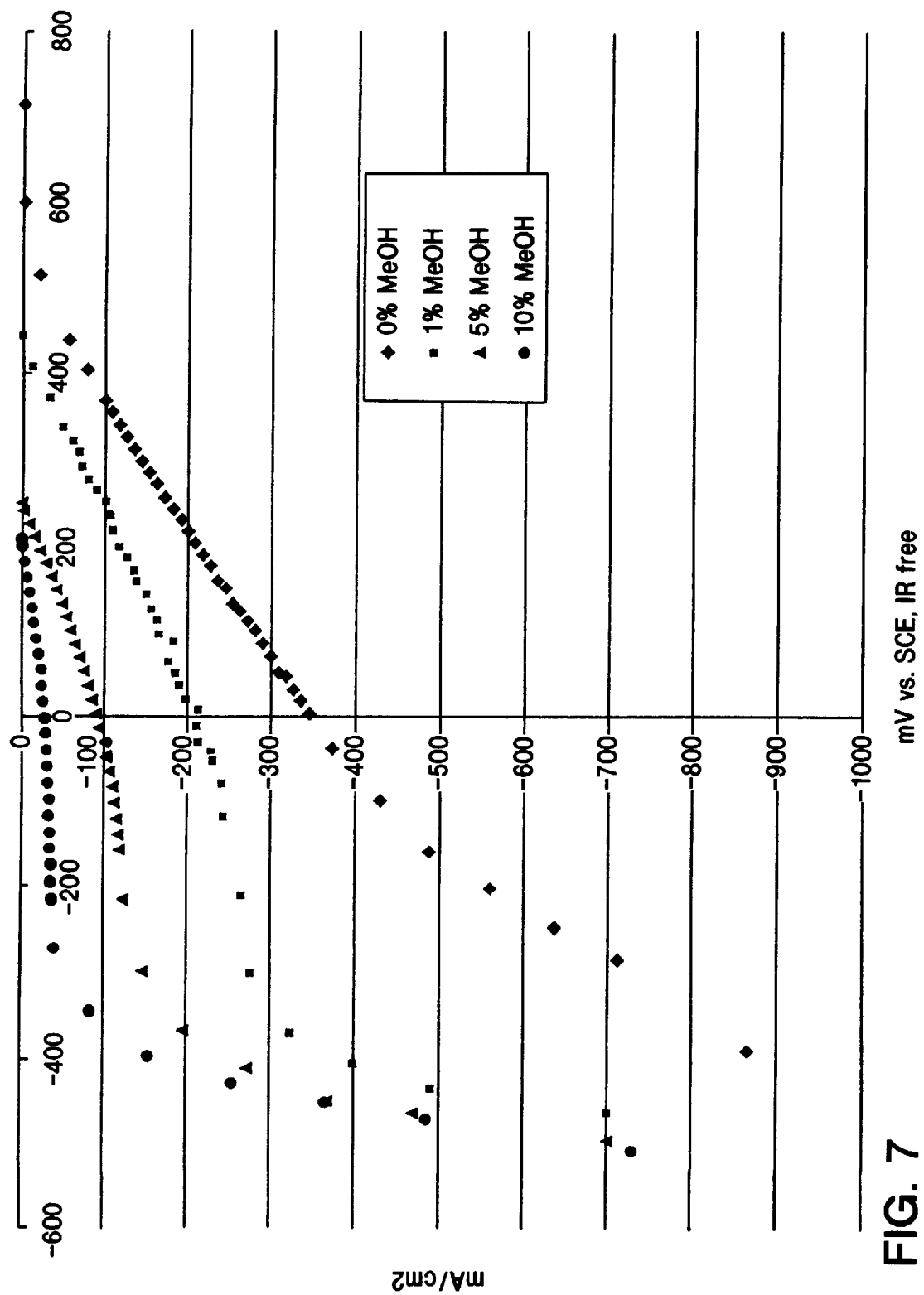
FIG. 7 shows potentiostated current—cathode potential curves for samples of single-sided ELAT™ with 1 mg Pt/cm$^2$, 30% Pt/C in 0.5 M H$_2$SO$_4$, at 70+/−2° C., with and without methanol. Methanol is added as 1, 5, or 10% by volume. Platinum foil 3 cm×2 cm serves as the counter electrode. A standard calomel electrode serves as the reference. Reported potentials are corrected for IR using the current interrupt method.
Figure 8:
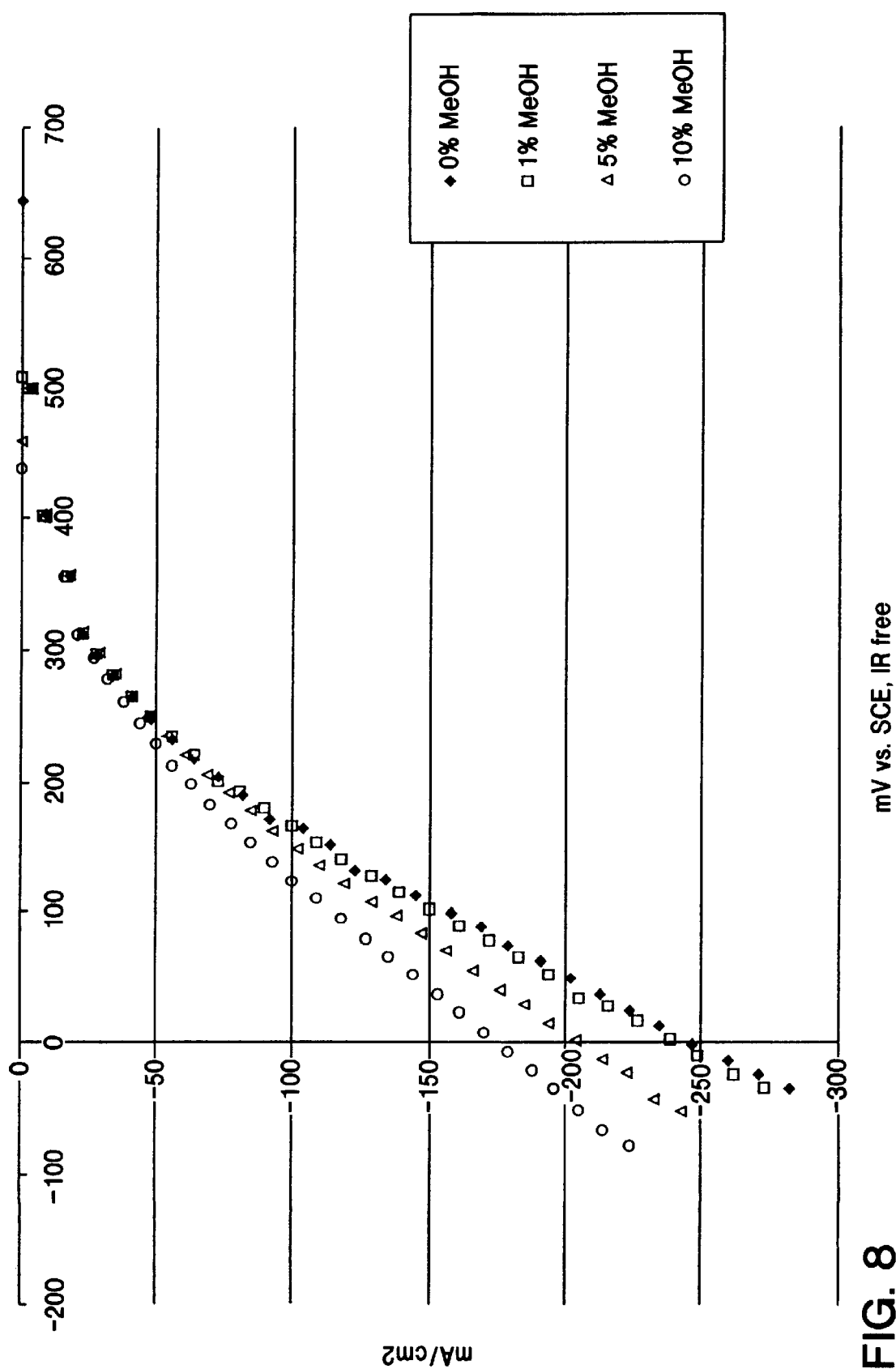
FIG. 8 shows potentiostated current—cathode potential curves for of single sided flow-through electrode as in Example 4 with 1.05 mg/cm$^2$ Rh as RhS$_x$, 30% RhS$_x$/C in 0.5 M H$_2$SO$_4$, at 70+/−2° C., with and without methanol. Methanol is added as 1, 5, or 10% by volume. Platinum foil 3 cm×2 cm serves as the counter electrode. A standard calomel electrode serves as the reference. Reported potentials are corrected for IR using the current interrupt method.

FIG. 7 shows the case of an ELAT activated with the commercial Pt on Vulcan XC-72 catalyst of Example 4 operated as the cathode under a potential control in the half-cell, at 70° C. and in 0.5M $H_2SO_4$. For each addition of methanol since the very first one, an instant and substantial reduction in oxygen reduction current due to the methanol poisoning can be noticed. FIG. 8 shows the ELAT™ of Example 3 paragraph a) activated with the rhodium sulphide catalyst of Example 1, operating under the same regimen. In this case, a shift in cathodic potential was observed only at the highest concentration levels of methanol. These last two figures illustrate the highly selective nature of the rhodium sulphide catalyst inasmuch as the catalyst is able to readily reduce oxygen in the presence of methanol.

COMPARATIVE EXAMPLE 3

Figure 9:
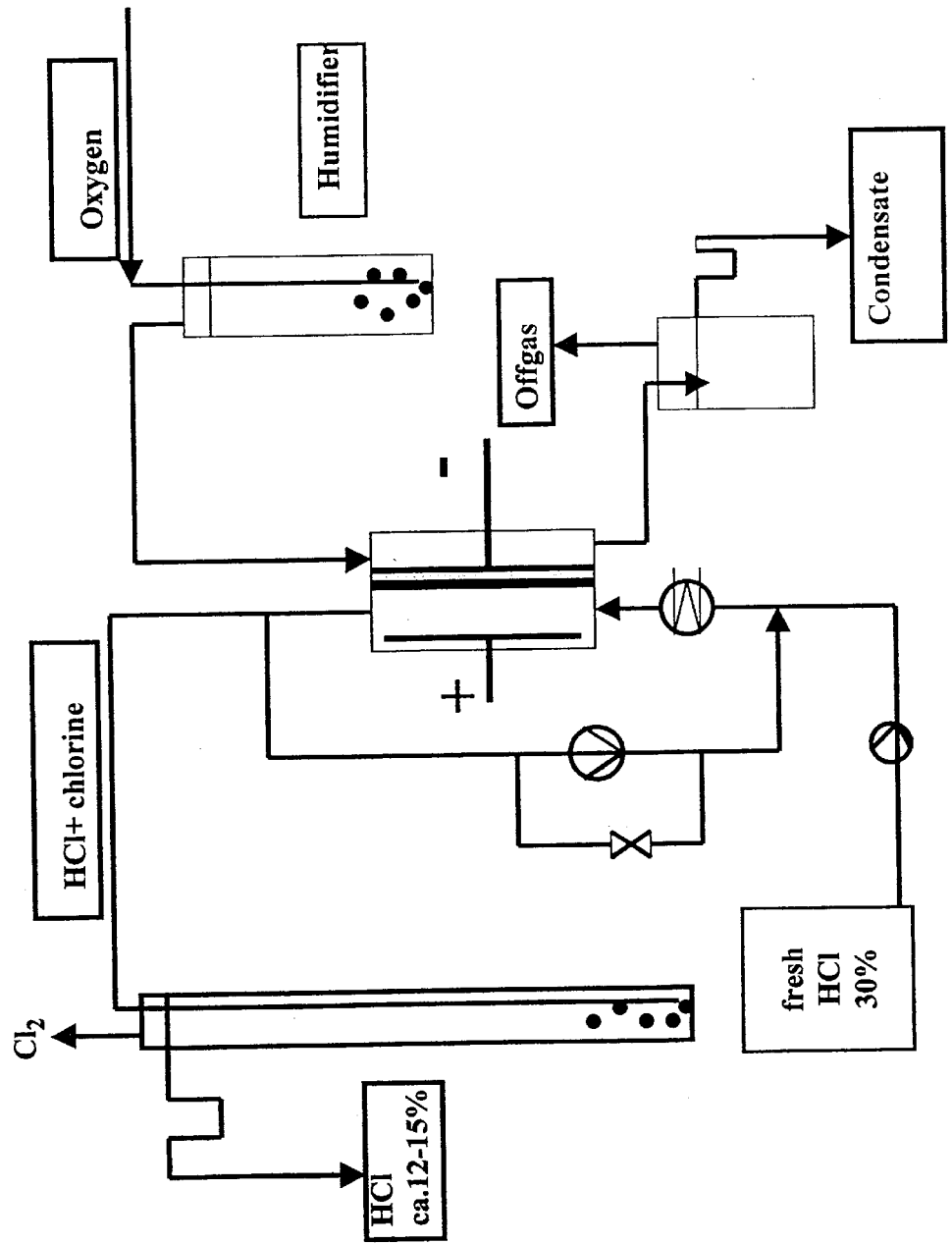
FIG. 9 shows the experimental set-up for the high current density and upset temperature comparative testing of the various oxygen depolarised cathode (ODC) types with continuous temperature and concentration control. The effective cell area was 100 cm$^2$.

In an arrangement as shown in FIG. 9 with an electrochemical cell of 100 $cm^2$ active area, a gap of 2 mm between anode and membrane of type Nafion 324 and an ELAT cathode of the single side type catalysed with platinum supported on carbon powder, technical grade hydrochloric acid was electrolysed. For this purpose the anolyte cycle was under hydrostatic pressure of 400 mbar to press the membrane against the ODC which itself was pressed against the cathodic current distributor mesh to be electrically contacted. The concentration of the anolyte cycle was kept at ca. 14% as fed into the cell and the ca. 13% as leaving the cell. For this purpose the anolyte was circulated with a pump and the concentration loss in the electrolysis was compensated by continuously feeding fresh concentrated acid into the circuit. The temperature of the anolyte leaving the cell was controlled to about 70° C. via a heat exchanger between pump and cell. The current density throughout the experiment was 5 $kA/m^2$.

Figure 10:
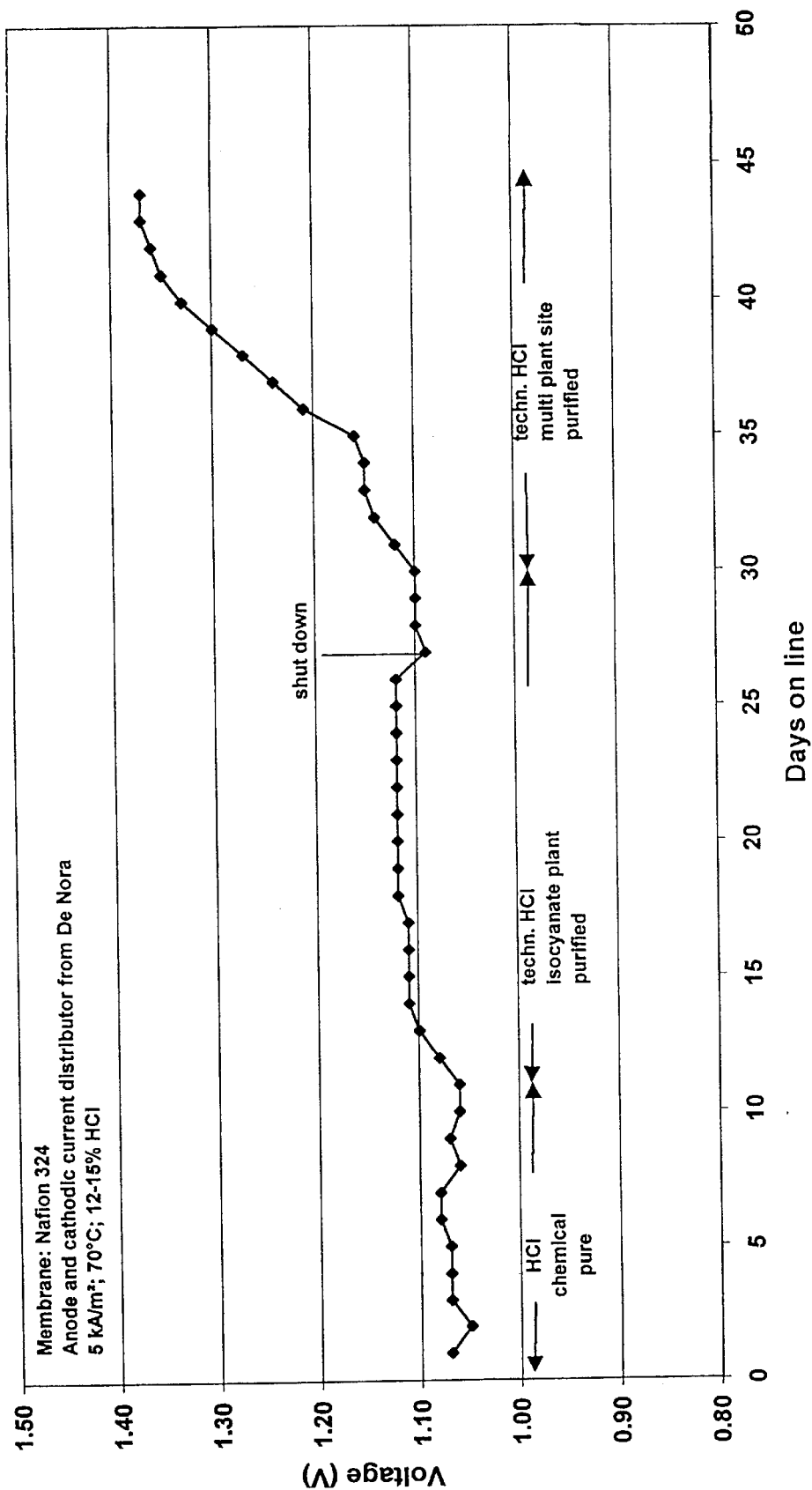
FIG. 10 shows the behaviour of the cell voltage of a Platinum catalysed ODC during an electrolysis of chemical pure and technical grade hydrochloric acid of different provenience, of an isolated isocyanate plant and a multi plant input site system with different sources of hydrochloric acid which was purified respectively with activated carbon and subsequently with an adsorption resin of type OC 1066 manufactured by Bayer AG, Germany.

As can be seen in FIG. 10, during the electrolysis with chemical pure hydrochloric acid the cell voltage was between 1.06 and 1.08 V. With feeding the acid coming from the isocyanate plant which was purified with activated carbon and subsequently with adsorption resin of type OC 1066 from Bayer AG (Germany) the cell voltage gradually increased for 50 to 60 mV and stabilised at this level. In the same arrangement in a next step with the same purification hydrochloric acid of a multi plant site was supplied to the experiment. The effect was a dramatic increase of cell voltage for about 260 mV, which was only to a minor part recovered after a shut down, showing the high sensitivity of the platinum catalyst with respect to organic contaminants especially of the second type, partly identified as tensides from polymerised ethylene and propylene oxides and acrylic acid esters. This effect is rather surprising in view of the fact that the ODC is hydraulically separated from the anode compartment by the Naflon membrane.

COMPARATIVE EXAMPLE 4

Figure 11:
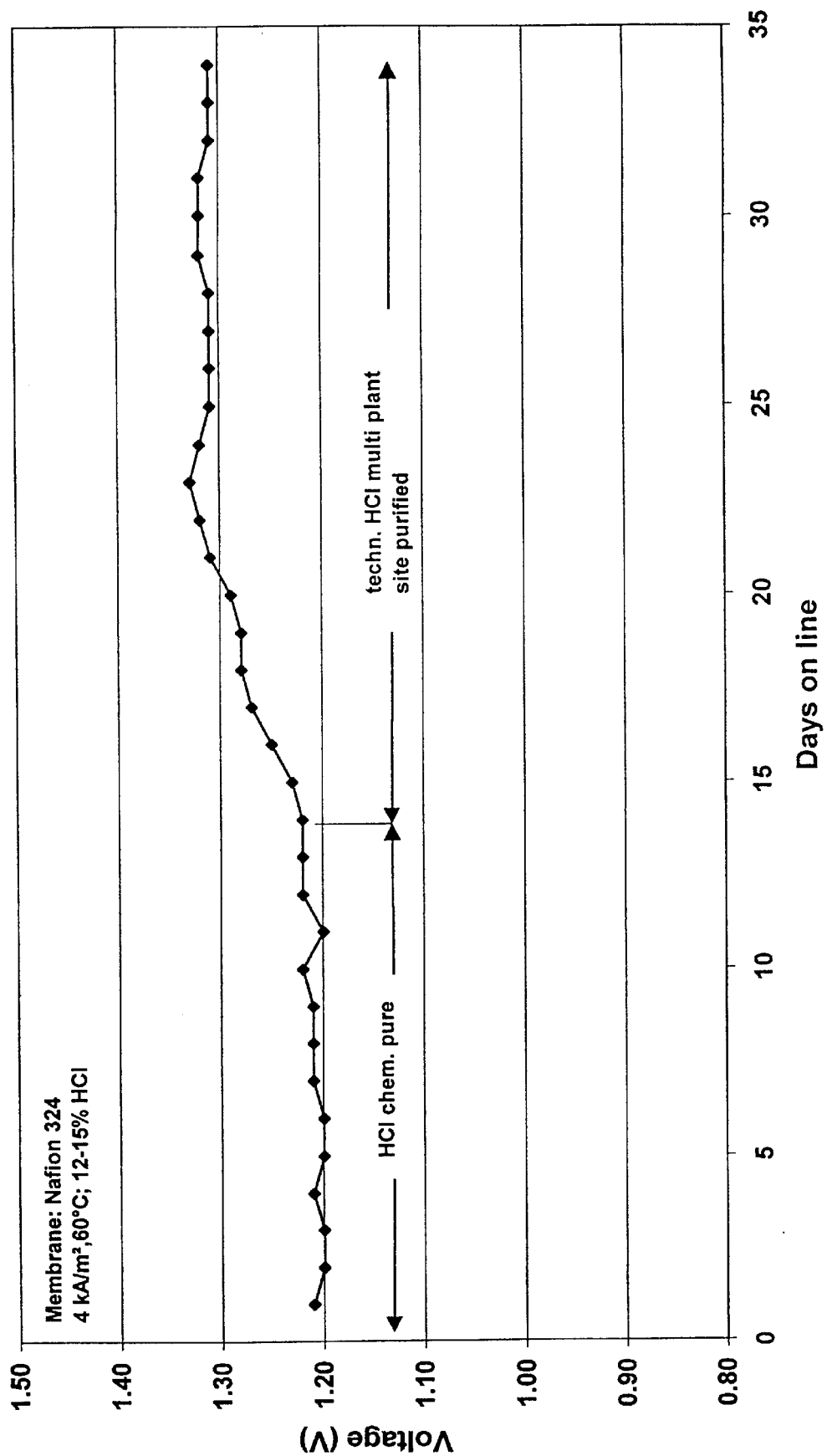
FIG. 11 shows the results of the electrolysis of hydrochloric acid with an ODC with rhodium/rhodium oxide catalyst. Chemical pure and technical grade hydrochloric acid, purified with activated carbon and subsequently with a resin of type EP63 manufactured by Bayer AG, was electrolysed.

In another experiment with the same arrangement of FIG. 9 but with a single sided ELAT catalysed with carbon powder carried rhodium/rhodium oxide the cell behaviour was found to be the following: the start-up voltage under chemical pure acid proved to be ca 130 mV higher than comparative example 3, as can be seen in FIG. 11. It should be noticed, that this test was run with a current density of 4 $kA/m^2$ and a temperature of 60° C. After feeding technical grade hydrochloric acid of the multi plant site mentioned in example 7 and purified with activated carbon and subsequently with another resin of type EP63 from Bayer AG (Germany) the cell voltage increased and stabilised about 100 mV higher. This behaviour was promising with respect to the reduced sensitivity against organic contaminants still passing the purification line. However, during this experiment the catalyst loss was nearly 30%, as measured in catholyte drain. This gave a hint, that the stability of this catalyst against being leached out was not sufficient, as well as the cell voltage.

EXAMPLE 7

Figure 12:
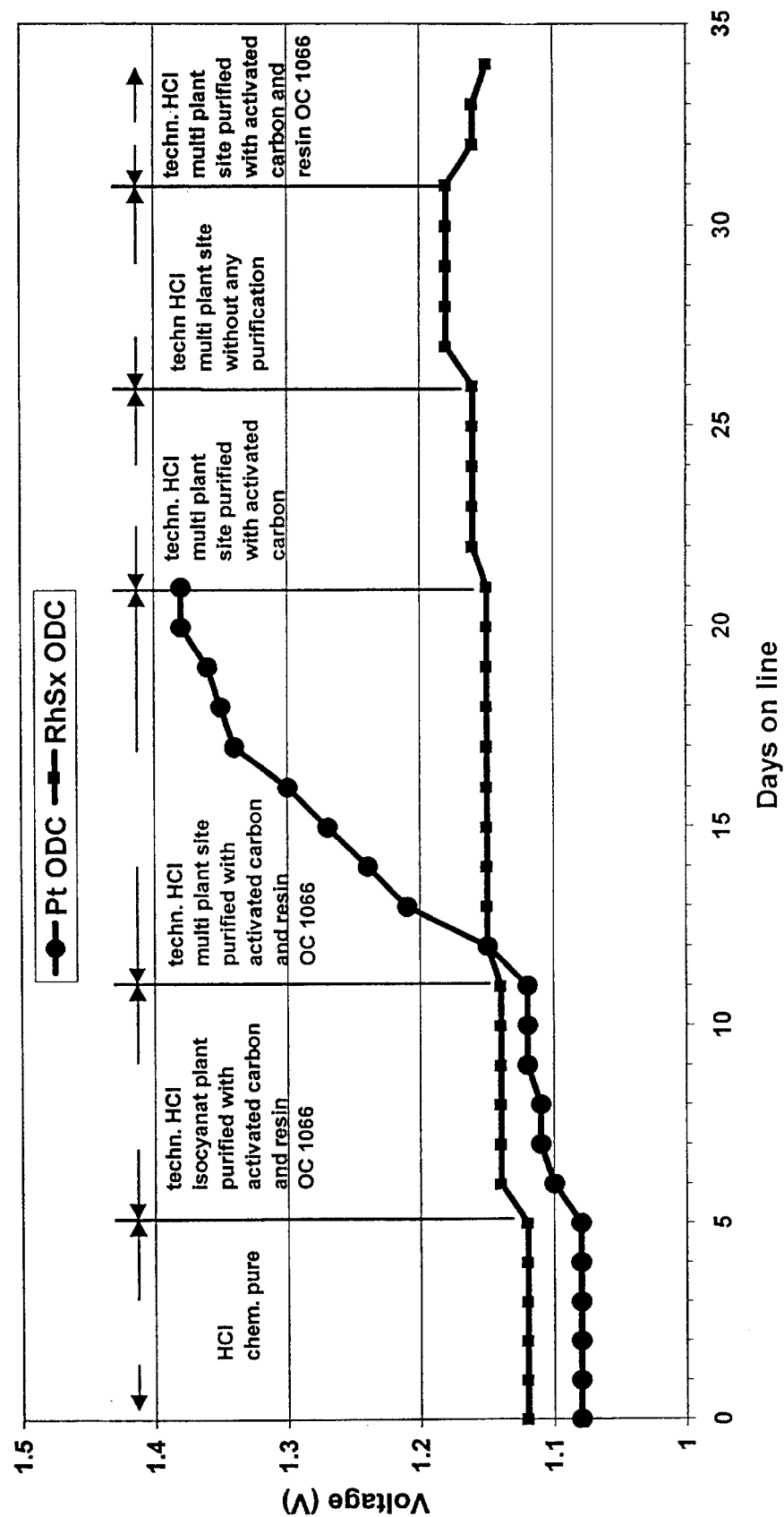
FIG. 12 shows the results of the electrolysis of different kinds of hydrochloric acid with the new catalyst on rhodium sulphide basis in comparison to a platinum catalysed ELAT.

In this experiment with the same arrangement as for comparative examples 3 and 4 the new carbon powder carried catalyst on rhodium sulphide basis in a single side ELAT was tested in comparison to a platinum catalyst in the same type ELAT. With a current density of 5 $kA/m^2$ and an operating temperature of 70° C. the starting voltage proved to be merely 40 mV higher for the rhodium sulphide catalyst as for the platinum catalyst during the first days of operation with chemical pure hydrochloric acid. With acid coming from an isocyanate plant which was purified with activated carbon and subsequently with adsorption resin of type OC 1066 from Bayer the cell voltage stabilised only 20 mV higher, as can be seen in FIG. 12. The voltage increase for the platinum catalyst was 40 mV. Changing to the technical grade hydrochloric acid of the multi plant site, purified the same way, the voltage increased further 10 mV only for the rhodium sulphide catalyst but about 260 mV for platinum catalyst. Omitting the second step of purification with resin of type OC 1066 the increase in cell voltage was 10 mV only for the rhodium sulphide. Electrolysis without any purification resulted in an increase of cell voltage for 20 mV for the rhodium sulphide catalyst only. These last two steps had not been performed with the platinum catalyst. Going back to the full purification proved the effect of increasing cell voltage to be reversible for the rhodium sulphide catalyst.

EXAMPLE 8

Figure 13:
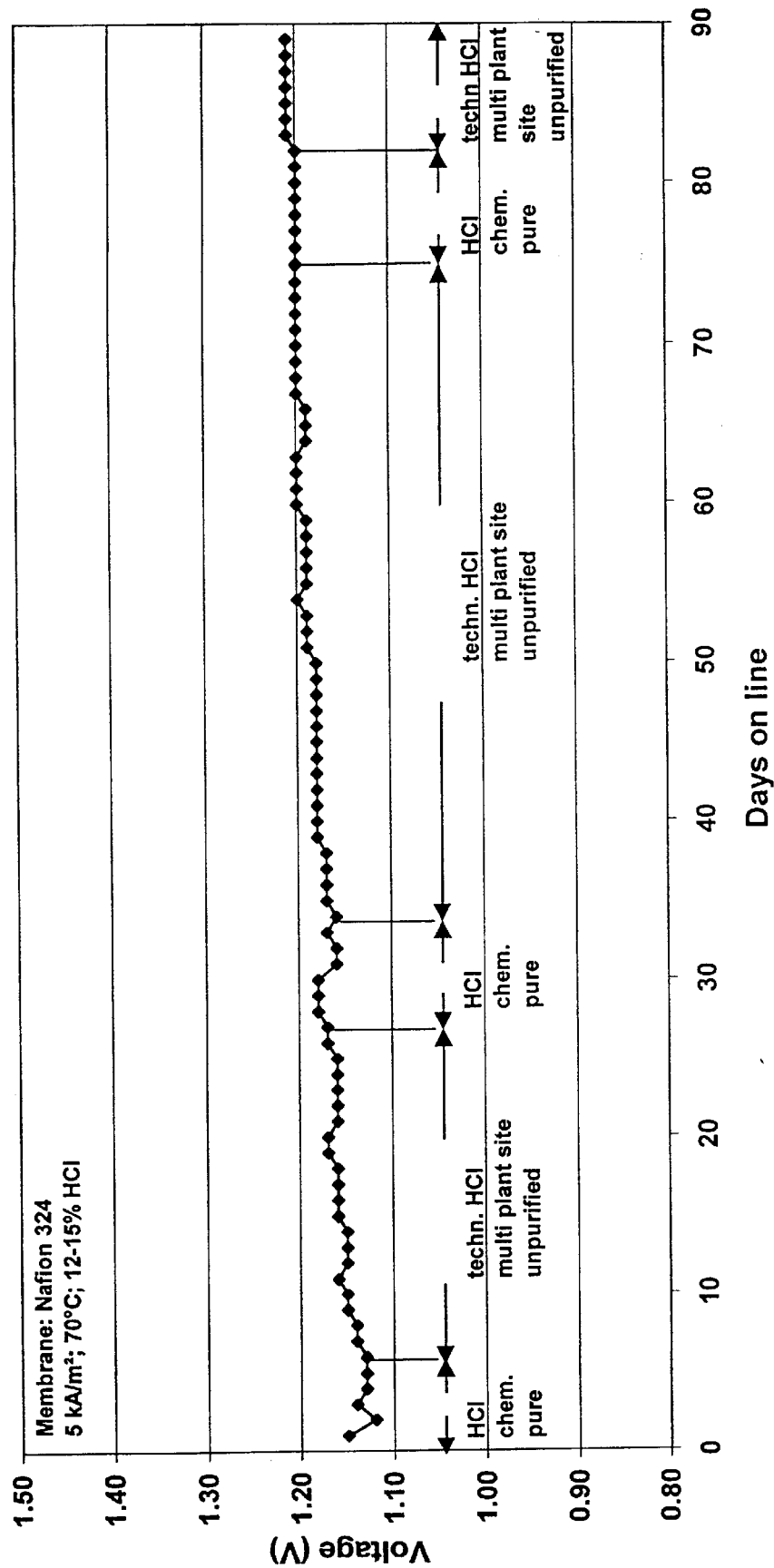
FIG. 13 shows the results of rhodium sulphide catalysed ODC in alternating operation with chemical pure and technical grade hydrochloric acid, purified with activated carbon.

In a long time test run over 90 days with the same arrangement and using a rhodium sulphide catalyst as in example 7 technical grade hydrochloric acid of a multi plant site only purified with activated carbon or chemical pure hydrochloric acid were supplied alternately. The surprising result was that nearly no effect due to the technical grade acid was found, which proved that the purification with activated carbon is sufficient, as can be seen in FIG. 13. The organic impurities, predominantly mono and di-chlorobenzenes, can be reduced to a level of <1 ppm with the activated carbon.

EXAMPLE 9

In a pilot plant with a four element electrolyser of an element size of 0.85 m² a long time test under industrial conditions was performed. In an analogous arrangement as in FIG. 9 with 400 mbar anolyte pressure, the operating temperature was controlled to ≦60° C. and the hydrochloric acid inlet concentration to ca. 14% by weight. Except for the start-up period with 3 kA/m² throughout the operation a current density of 4 kA/m² was kept. Over a period of more than 280 days, predominantly technical grade hydrochloric acid of the multi plant site type was electrolysed. The acid was purified with activated carbon only. As can be seen from FIG. 14, the element voltage was surprisingly stable, showing again the high tolerance of inserted rhodium sulphide catalyst in ELAT type electrodes. The other very positive result was the indifference of the electrodes under shut down conditions. The plant was shut down without polarisation for 16 times and no influence on the voltage could be observed. The amount of catalyst loss as measured via rhodium content in the catholyte drain was in total about 6.5% by weight with respect to the total amount of catalyst. The main loss occurred during the first start up and the first shut downs (ca. 3%). During normal operation the loss of catalyst was found to be 1.57% by weight only, promising together with the decreasing losses during shut downs an electrode lifetime of several years.

EXAMPLE 10

In a laboratory cell in the experimental arrangement of examples 7 and 8 an oxygen depolarised cathode of the flow through type catalysed with rhodium sulphide was tested with technical grade hydrochloric acid of the multi plant site purified with activated carbon only as in examples 7 through 9. The electrode was intermittently supplied with pure oxygen and air. It could be proven that even with air as cathodic feed-gas the cell could be operated up to 5 kA/m². Despite the fact, that technical grade acid was utilised, there was the surprising result of a good performance of the cell: applying 4 kA/m² the voltage increase was found to be 160 mV after three days of conditioning, see FIG. 15. Raising the current density to 5 kA/m² the voltage increased for another 160 mV. The air flow was 1 m³/h and 1.7 m³/h respectively. After reducing the depth of the cathodic gas room from 20 mm to 5 mm the air flow rate could be reduced to 0.4 m³/h for 5 kA/m² and the voltage was even lower with the reduced air flow rate, showing the possibility for further optimisation for this mode of operation in increasing the off-gas exchange rate with reducing the flow channel dimension. The important result is that using a flow through type oxygen depolarised cathode catalysed with rhodium sulphide an operation with air and with technical grade hydrochloric acid is possible.

EXAMPLE 11

A comparative test with technical grade hydrochloric acid under the same conditions as in example 10 with a single sided ODC versus a flow through type ODC, both catalysed with $RhS_x$ was carried out. An increasing amount of nitrogen mixed into the pure oxygen results in a voltage increase applying the single sided ODC. With only 30% of nitrogen the voltage reaches a level of >1.6 V with a strong exponential behaviour towards higher percentages of nitrogen. The behaviour of the flow through type ODC in the contrary showed a much smaller effect, as can be seen in FIG. 16. In addition it could be shown that an increase of the gas flow by a factor of 5 through the same non flow optimised cathode chamber reduces the increase of cell voltage with the flow through type ODC from 70 mV to 30 mV only. This indicates that only the flow through type ODC was capable to be operated with depleted oxygen or even with air. At the same time the $RhS_x$ catalysed ODC was found to be tolerant against organic impurities in the hydrochloric acid.

We claim:

1. A process for electrolysing an aqueous solution of hydrochloric acid to chlorine in an electrochemical cell provided with an anode compartment and a cathode compartment including at least one gas diffusion cathode comprising an electrically conductive web provided on at least one side thereof with a coating of a catalyst for the electroreduction of oxygen comprising rhodium sulphide and optionally containing at least one fluorinated binder incorporated therein, comprising introducing aqueous hydrochloric acid containing contaminant species into the anode compartment and oxygen into the cathode compartment while impressing a direct electric current on the cell.

2. The process of claim 1 wherein said species are organic contaminants resulting from the production of the aqueous hydrochloric acid solution as the by-product of the chlorination of an organic feedstock.

3. The process of claim 1 wherein said species are organic contaminants resulting from the production of the aqueous hydrochloric acid solution as the by-product of the thermal decomposition of chlorinated organic compounds.

4. The process of claim 1 wherein said species are contaminants resulting from the interaction of the aqueous hydrochloric acid with rubber or plastic liner systems of the plant or other organic compounds leaching parts of the system.

5. The process of claim 1 wherein said hydrochloric acid containing contaminant species is pre-purified by means of activated carbon.

6. The process of claim 1 wherein said hydrochloric acid containing contaminant species is pre-purified by means of activated carbon and at least one adsorption resin.

7. The process of claim 1 wherein said hydrochloric acid containing contaminant species is pre-purified by means of at least one adsorption resin.

8. The process of claim 1 wherein the cathode compartment of the electrochemical cell is fed with air or depleted oxygen.

9. The process of claim 8 wherein the gas diffusion cathode is a flow-through type cathode.

10. The process of claim 1 wherein the anode and cathode compartments of the electrochemical cell are separated by an ion exchange membrane.

* * * * *